United States Patent [19]
Schauder

[11] Patent Number: 5,936,058
[45] Date of Patent: Aug. 10, 1999

[54] IMPACT MODIFIED THERMOPLASTIC POLYMER BLENDS

[75] Inventor: Jean Roch Hector Schauder, Wavre, Belgium

[73] Assignee: Exxon Chemical Patents, Inc., Baytown, Tex.

[21] Appl. No.: 09/079,742

[22] Filed: May 15, 1998

[51] Int. Cl.[6] .................................................. C08G 64/00
[52] U.S. Cl. .......................................... 528/272; 528/196
[58] Field of Search ..................... 528/196, 272

[56] References Cited

U.S. PATENT DOCUMENTS

| | | | |
|---|---|---|---|
| 5,346,963 | 9/1994 | Hughes et al. | 525/285 |
| 5,648,423 | 7/1997 | Kagami et al. | 525/66 |
| 5,705,565 | 1/1998 | Hughes et al. | 525/65 |

FOREIGN PATENT DOCUMENTS

| | | |
|---|---|---|
| 0 735 060 | 10/1996 | European Pat. Off. . |
| 0 754 731 | 1/1997 | European Pat. Off. . |
| 09 087 476 | 3/1997 | Japan . |
| 95/04781 | 2/1995 | WIPO . |
| 97/27259 | 7/1997 | WIPO . |

Primary Examiner—Terressa Mosley
Attorney, Agent, or Firm—C. L. Bell

[57] ABSTRACT

This invention relates to a composition comprising:
a) 2 to 50 weight % of an first ethylene alpha-olefin copolymer having a density of 0.86 to 0.91 g/cc, a Melt Index of 150 g/10 min or less and an Mw/Mn of 4 or less modified with an unsaturated acid or anhydride and a second ethylene alpha-olefin copolymer having a 0.86 to 0.925 g/cm$^3$ and/ or homopolyethylene; and
b) 98 to 50 weight percent of a thermoplastic polymer comprising a functional group capable of interacting with the unsaturated acid or anhydride.

20 Claims, 1 Drawing Sheet

500,058

IMPACT MODIFIED THERMOPLASTIC POLYMER BLENDS

FIELD OF THE INVENTION

This invention relates to an impact modified thermoplastic composition comprising a functionalized ethylene α-olefin copolymer, an ethylene α-olefin copolymer or homopolyethylene and a thermoplastic polymer.

BACKGROUND OF THE INVENTION

Maleic anhydride grafted EP(D)M's have not been used much for impact modification of polyesters because the transesterification reaction between polyesters and the maleic anhydride group of the MA-grafted-EP is a slow reaction and because EP based modifiers having a high level of maleic anhydride and a low viscosity have not been available. Recently, Dow Chemical Company has described both in U.S. Pat. No. 5,346,963 and PCT WO 94/25526 that substantially linear ethylene polymers produced by Dow "constrained geometry" catalysts and grafted with an unsaturated organic compound exhibit adhesive properties as well as impart desirable impact properties to various thermoplastic polymers blends such as polyamide or polyesters. Likewise in U.S. Pat. No. 5,705,565 Dow Chemical Company discloses blends of their maleated ethylene-octene copolymers with polyamide. In polybutylene terephthalate, these modifiers are however only effective as impact modifiers at treat levels around 20%. In order to be competitive with other modifiers such as core shell polybutadiene polymethacrylate polymers or MBS (methacrylate, butadiene stryrene copolymers), impact modification at lower treat levels is required. Surprisingly, we have observed that, the combination of a functionalized ethylene alpha-olefin copolymer and an ethylene alpha-olefin copolymer gives improved impact performances at lower treat levels versus a straight functionalized ethylene alpha-olefin copolymer having the same functionality level and same viscosity.

Art disclosed for US purposes includes WO 97/27259.

SUMMARY OF THE INVENTION

This invention relates to a rubber toughened thermoplastic composition comprising an ethylene alpha-olefin copolymer grafted with an unsaturated acid or anhydride, an ungrafted ethylene alpha-olefin copolymer or homopolyethylene and a thermoplastic polymer comprising a functional group capable of interacting with the unsaturated acid or anhydride, provided that the thermoplastic polymer is not a polyamide.

DETAILED DESCRIPTION

Figure 1:
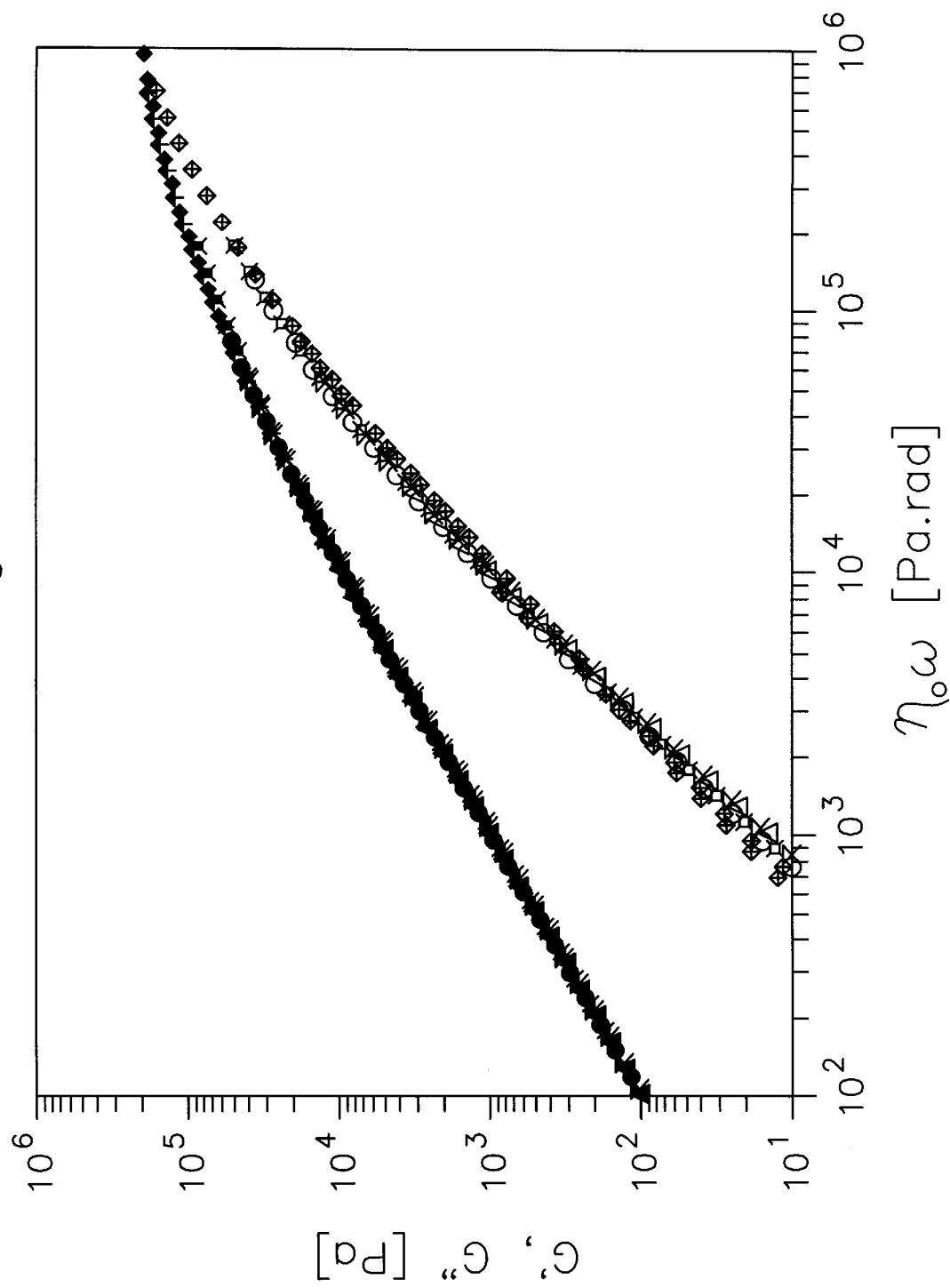
FIG. 1 is a graph of normalized elastic and loss module data obtained on a series of ethylene-butene polymers with weight average molecular weights ranging from 30,000 to 120,000, but having different densities and comonomer contents. The polymers had similar molecular weight distributions, thus all the curves overlap.

This invention relates to an impact modified thermoplastic composition comprising:
  a) 2 to 50 weight % of an first ethylene alpha-olefin copolymer having a density of 0.86 to 0.91 g/cc, a Melt Index of 150 g/10 min or less and an Mw/Mn of 4 or less modified with an unsaturated acid or anhydride and a second ethylene alpha-olefin copolymer having a density of 0.86 to 0.925 g/cm$^3$ and/or homopolyethylene; and
  b) 98 to 50 weight percent of a thermoplastic polymer comprising a functional group capable of interacting with the unsaturated acid or anhydride.

This invention also relates to a method of modifying a thermoplastic polymer comprising combining:
  a) 2 to 50 weight % of an first ethylene alpha-olefin copolymer having a density of 0.86 to 0.91 g/cc, a Melt Index of 150 g/10 min or less and an Mw/Mn of 4 or less modified with an unsaturated acid or anhydride and a second ethylene alpha-olefin copolymer having a density of 0.86 to 0.925 g/cm$^3$ or homopolyethylene; with
  b) 98 to 50 weight percent of the thermoplastic polymer provided that the thermoplastic polymer comprises a functional group capable of interacting with the unsaturated acid or anhydride.

In a preferred embodiment the first ethylene copolymer and the second ethylene copolymer or the homopolyethylene, which together make up component a) above, are present at 2 to 30 weight percent, even more preferably 7 to 25 weight percent and the thermoplastic polymer is present at 98 to 70 weight percent, more preferably 93 to 75 weight percent, based upon the weight of the first ethylene copolymer, the second ethylene copolymer, or the homopolyethylene and the thermoplastic polymer.

In a preferred embodiment component a) comprises about 10 to about 70 weight % first ethylene copolymer, more preferably 15 to 50 weight percent first ethylene copolymer and about 90 to 30 weight percent second ethylene copolymer and/or homopolyethylene, even more preferably 85 to 50 weight percent second ethylene copolymer and/or homopolyethylene, based upon the weight of the first ethylene copolymer, the second ethylene copolymer and/or the homopolyethylene present in the blend.

In a preferred embodiment the first copolymer is a copolymer of ethylene and an α-olefin, preferably a $C_2$ to $C_{40}$ α-olefin, even more preferably a $C_2$ to $C_{18}$ α-olefin, even more preferably a $C_2$ to a $C_{12}$ α-olefin. In a preferred embodiment the ethylene copolymer, prior to modification with the unsaturated acid or anhydride, has a molecular weight distribution (Mw/Mn) of 3.5 or less, preferably 3 or less, even more preferably 2 or less, even more preferably between 2 and 1. In another preferred embodiment the ethylene copolymer, prior to modification whit the unsaturated acid or anhydride, has a density of 0.88 to 0.91 g/cc and a Composition Distribution Breadth Index (CDBI) of 50% or more, preferably 60% or more, even more preferably 70% or more, even more preferably 80% or more, even more preferably 90% or more. CDBI is a measure of the uniformity of comonomer distribution within a given sample and is measured according to the method described in PCT publication WO 93-03093, published Feb. 18, 1993, including that fractions having a molecular weight less than 15,000 Mw(weight average molecular weight) are disregarded. In another preferred embodiment the first ethylene copolymer, prior to modification whit the unsaturated acid or anhydride, has a Melt Index of 100 g/10 min or less, preferably 50 g/10 min or less, even more preferably 20 g/10 min or less, even more preferably 10 g/10 min or less. In another preferred embodiment the ethylene copolymer also has a density between 0.86 and 0.90, more preferably between 0.86 and 0.89, even more preferably between 0.865 and 0.88.

In another embodiment the first ethylene copolymer, prior to modification with the unsaturated acid or anhydride, has an elastic modulus (G') of 150 Pa or less at a normalized frequency of 2000 rad•Pa, preferably between 150 and 30 Pa, even more preferably 145 to 50 Pa, even more preferably 120 to 50 Pa. The normalized frequency ($w\eta_o$) is defined to be the measured frequency multiplied by the zero shear viscosity ($\eta_o$)

The first ethylene copolymer further comprises an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C=O). Examples include maleic, fumaric, acrylic, methacrylic, itaconic, crotonic, αmethyl crotonic, and cinnamic acids as well as their anhydrides, esters and salt derivatives. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the ethylene copolymer and the unsaturated acid or anhydride.

In a preferred embodiment the first ethylene copolymer is a grafted ethylene copolymer comprising ethylene and an alpha-olefin grafted with 0.1 weight % or more of an unsaturated acid or anhydride wherein the copolymer prior to grafting is characterized by:

1) a vinylidene to vinyl end chain unsaturation ratio of 3 or less, 2) and optionally, a CDBI of 60% or more if the polymer has a density of 0.90 g/cc or more or a reactivity ratio between 0.5 and 1.5 or less if the polymer has a density of less than 0.90 g/cc, and the grafted copolymer has a number of unsaturated acid or anhydride molecules per chain of 2 or more as calculated according to the following formula: [Mn*UAA(wt %)]/[UAA(Mw)] wherein Mn is the number average molecular weight as measured by GPC, UAA(wt %) is the weight percent of the unsaturated acid or anhydride as measured by FTIR spectroscopy and UAA(Mw) is the molecular weight of the unsaturated acid or anhydride. In a preferred embodiment the copolymer prior to grafting has an Mw/Mn greater than ($I_{10}/I_2$)-4.63. Melt flow ratio measured as the ratio of $I_{10}$ to $I_2(I_{10}/I_2)$ is measured by the procedure stated in ASTM D-1238.

In another preferred embodiment the grafted first ethylene copolymer has a number of unsaturated acid or anhydride molecules per chain of 2 or more as calculated according to the following formula: [Mn*UAA(wt %)]/[UAA(Mw)] wherein Mn is the number average molecular weight as measured by GPC, UAA(wt %) is the weight percent of the unsaturated acid or anhydride as measured by FTIR spectroscopy and UAA(Mw) is the molecular weight of the unsaturated acid or anhydride, preferably 3 or more, even more preferably 5 or more, even more preferably 10 or more.

Unsaturated acid or anhydride content is measured by FTIR (Fourrier Transformed Infrared Spectroscopy) as described in the experimental and testing section below.

The number of unsaturated acid or anhydride (UAA) molecules per polymer chain is obtained by multiplying the total unsaturated acid or anhydride content as measured by FTIR spectroscopy by the number average molecular weight divided by the unsaturated acid or anhydride molecular weight as described in equation:

[Mn*UAA(wt %)]/[UAA(Mw)]

wherein Mn is the number average molecular weight as measured by GPC, UAA(wt %) is the weight percent of the unsaturated acid or anhydride as measured by FTIR spectroscopy and UAA(Mw) is the molecular weight of the unsaturated acid or anhydride Unsaturations (vinylidene, vinyls chain end unsaturation, etc) in polyolefins are measured by proton NMR at 125° C. as described in the experimental and testing section below.

Reactivity ratio is measured by the $^{13}$C NMR procedure described in K. Soga, Polymer Bulletin, 1983, Vol 10. pg 168.

Ethylene copolymers having narrow Mw/Mn and high CDBI's which are useful as first or second copolymers in the practice of this invention can be produced by the methods described in U.S. Pat. No. 5,055,438; U.S. Pat. No. 5,507,475; U.S. Pat. No. 5,096,867; U.S. Pat. No 5,264,405; U.S. Pat. No. 5,324,800; U.S. Pat. No. 5,017,714; U.S. Pat. No. 5,240,894; U.S. Pat. No. 5,198,401; U.S. Pat No. 5,153,157; WO 92 00333; WO 94 03506; EPA 520,732; EPA 129,368; EPA 277,003; EPA 277,004; and CA 1,268,753, which are incorporated by reference herein. Such polymers are available from Exxon Chemical Company in Baytown, Tex. under the Tradename EXACT™. These polymers can be modified to contain the unsaturated acid or anhydride group by methods known in the art, such as U.S. Pat. Nos. 3,326,917, 4,950,541 and 5,194,509, which are incorporated by reference herein.

Preferred second ethylene alpha-olefin copolymers are one or more copolymers of ethylene and up to 50 weight % of an alpha-olefin, preferably a C3 to C20 linear, branched or cyclic alpha olefin. Preferred alpha-olefin include propylene, butene, pentene, hexene, heptene, octene, nonene, dodecene, cyclopentene, 3,5,5-trimethylhexene-1, 3-methylpentene-1, 4-methyl pentene-1. Preferred copolymers also include terpolymers of the above monomers. In another preferred embodiment the second ethylene copolymer comprises a terpolymer of ethylene, a C3 to C20 comonomer and a diene. Preferred dienes include butadiene, pentadiene, hexadiene, norbornene, ethylidene norbornene, vinylidene norbornene, dicyclopentadiene, and substituted versions thereof.

The second ethylene copolymer may or may not be similar to the ethylene polymer which is functionalized or can also belong to the families of VLDPE (very low density polyethylene, density 0.90 to 0.915 g/cc), LLDPE (linear low density polyethylene, density 0.915 to 0.935 g/cc). The first and second ethylene copolymers may be the same copolymer, except of course that the first ethylene copolymer is modified with the unsaturated acid or anhydride. In a preferred embodiment the second ethylene copolymer has a Melt Index of 100 g/10 min or less, preferably 50g/10 min or less, even more preferably 20 g/10 min or less. In another preferred embodiment the second ethylene copolymer has a density of 0.86 to 0.93 g/cc, preferably 0.865 to 0.915 g/cc, even more preferably, 0.865 to 0.90 g/cc.

In another embodiment the first ethylene copolymer is combined with homopolyethylene to form component a). The homopolyethylene preferably has a density of 0.910 to 0.935 g/cm$^3$, preferably 0.915 to 0.925 g/cm$^3$. The homopolyethylene preferably is LDPE (low density polyethylene, density 0.910 to 0.935 g/cc).

In a preferred embodiment the second ethylene copolymer has a density of 0.90 to 0.925 g/cm$^3$ and a CDBI of over 80%, preferably between 80 and 99%.

In another embodiment the second ethylene copolymer has an elastic modulus (G') of 150 Pa or less at a normalized frequency of 2000 rad•Pa, preferably between 150 and 30 Pa, even more preferably 145 to 50 Pa, even more preferably 120 to 50 Pa.

In another embodiment the first ethylene polymer and the second ethylene are the same polymer except that the first ethylene polymer is also modified with an unsaturated acid or anhydride.

Preferred thermoplastic polymers include any thermoplastic copolymer comprising a functional group capable of interacting with the unsaturated acid or anhydride group present with the ethylene polymer. Examples include, polyesters including polyethylene terephthalate, polybutylene terephthalate (PBT), polyacetal, polycarbonate, and the like. Polyesters and polycarbonate are preferred thermoplastic polymers. PBT is a particularly preferred thermoplastic polymer. Polyamides are not preferred.

The first ethylene copolymer and the second ethylene copolymer and/or the homopolyethylene may be preblended by standard techniques known in the art such as dry blending, tumble blending and or melt blending. Mixing with the thermoplastic polymer can be done by the standard mixing methods known in the art such as melt blending, extrusion on a single or double screw extruder, and or mixing in a Banbury. Mixing conditions can include high temperatures, high shear, low shear, and the like. Typically the mixture must be heated at some point to melt the thermoplastic polymer. Hence in a preferred embodiment the blend is heated to a temperature near or above the thermoplastic polymer melting point. In a preferred embodiment the first ethylene copolymer and the second ethylene copolymer and/or the homopolyethylene are mixed together prior to blending with the thermoplastic polymer in a masterbatching process.

The blended product can be used in a variety of applications and can be used in any application where rubber toughened polymers are used today, including but not limited to, molded articles, including but not limited to parts such as car trim, car interior parts, car bumpers, under the hood components such as electrical connectors, and the like.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

Experiments and testing description

Mw and Mn were measured by gel permeation chromatography using polyisobutylene standards on a Waters 150 gel permeation chromatograph detector and a Chromatix KMX-6 on line light scattering photometer. The system is used at 135° C. with 1,2,4-trichlorobenzene as the mobile phase. Showdex (from Showa Denks America, Inc.) polystyrene gel columns 802, 803, 804 and 805 were used. This technique is discussed on "Liquid Chromatography of Polymers and Related Materials III" J. Cazes editor, Marcel Dekker, 1981, p207 which is incorporated by reference herein. No corrections for column spreading were employed. Mw/Mn was calculated from elution times. The numerical analyses were performed using the commercially available Beckman/CIS LALLS software in conjunction with the standard Gel Permeation package.

Unsaturated acid or anhydride content was measured by FTIR (Fourrier Transformed Infrared Spectroscopy). The reaction products were compressed at temperature of 165° C. into thin films from which infrared spectra were taken using a Mattson Polaris™ Fourrier Transformed Infrared Spectrometer at 2 $cm^{-1}$ resolution with the accumulation of 100 scans. The relative peak height of the anhydride absorption bond at 1790 $cm^{-1}$ and of the acid absorption (coming from the anhydride hydrolysis in the air) at 1712 $cm^{-1}$ compared with a bond at 4328 $cm^{-1}$ serving as internal standard was taken as a measurement of the MA content. % MA (total MA content)=k(A1790+A1712)/A4328, k being determined after internal calibration with a series of standards and having a value of 0.258 in this case.

Unsaturations (vinylidene, vinyls chain end unsaturation, etc) in polyolefins are measured by proton NMR at 125° C. 100 mg of polymer is dissolved in 1 cc of trichlorobenzene and 0.2 cc of deuterobenzene. The instrument is preferably a Variant™ Unity plus 300 MHz. The following parameters are preferably used: acquisition time: 3 sec, spectral window: 6000 Hz, pulse width: 30°, delay D1:5 sec, number of transients: 1024, spinning rate: 17 Hz. For measurements described herein the following chemical shifts were assigned to the different proton types (and hence to the different unsaturation types): 5.6–5.9 ppm:—C$\underline{H}$=CH2, 4.85–5.06: —CH=C$\underline{H}$2, 5.3–5.55: —C$\underline{H}$=C<, 5.06–5.3: —C$\underline{H}$=CH—, 4.6–4.85: >C=C$\underline{H}$2.

Rheological measurements were done at 190° C. under a nitrogen atmosphere on a commercial stress-controlled dynamic rheometer (SR-500 from Rheometric Scientific), using a 25 mm cone-and-plate geometry. The frequency sweep experiments covered a frequency range ω of 0.02 to 500 rad/s. Stress amplitude was 100 Pa, well within the linear viscoelastic region. Dynamic module G' and G", as well as complex viscosity η* were directly calculated by the rheometer control software. As it is known in the art, those three quantities are highly sensitive to molecular weight and other molecular parameters.

The zero-shear viscosity $\eta_o$ was directly retrieved from the graphs each time a well-defined plateau was observed on the complex viscosity values at low shear rates. When this was not the case, $\eta_o$ was extrapolated by fitting the complex viscosity data to the Cross equation:

$$\eta^* = \frac{\eta_o}{1 + (\omega\lambda)^n}$$

where 1 is an average relaxation time, n a power-law index, $\eta_o$ is the zero shear viscosity, η* is the complex viscosity, ω is frequency, and λ is relaxation time (inverse of the frequency at which shear thinning starts). The fits were performed with IRIS software, commercially available from Iris Development.

Then, dynamic module G' and G" were plotted as a function of the product $\omega\eta_o$ (referred as normalized frequency above). It is well established that $\omega\eta_o$ provides a temperature and molecular weight independent ordinate, see G. Marin and J. -P. Montfort, in Rheology for Polymer Melt Processing, pp. 95–139, J. -M. Piau and J. -F. Agassant (editors), Elsevier Science B.V. (1996), or F. Chambon, ANTEC '95, pp. 1157–1161. In this respect, plotting G' and G" vs $\omega\eta_o$ yields a normalized graph, which shows only the genuine differences between several samples. As an example, all data obtained on a series of ethylene-butene polymers with weight average molecular weights ranging from 30,000 to 120,000, but different densities and comonomer contents, nicely overlap on FIG. 1, because all these samples have similar molecular weight distribution. Following polymers have been used to generate these data: Exact 4049 has a density of 0.873 g/cm³ and a melt index (MI at 190° C., 2.16 kg) of 4.2 g/10 min, Exact 4006 has a density of 0.880 g/cm³ and a melt index (MI at 190° C., 2.16kg) of 10 g/10 min, Exact 4023 has a density of 0.882 g/cm³ and a melt index (MI at 190° C., 2.16 kg) of 35 g/10 min,, Exact 4033 has a density of 0.88 g/cm³ and a melt index (MI at 190° C., 2.16 kg) of 0.8 g/10 min, Exact 4042 has a density of 0.899 g/cm³ and a melt index (MI at 190° C., 2.16 kg) of 1.1 g/10 min, Exact 4044 has a density of 0.895 g/cm³ and a melt index (MI at 190° C., 2.16 kg) of 16.5 g/10 min; this last polymer is an ethylene hexene copolymer.

Any increase in G' at a specific value of $w\eta_o$ denotes a higher melt elasticity, which can be attributed to a change in molecular structure, either a broadening of molecular weight distribution, and/or the presence of long-chain branches.

Flex modulus (MPa) was measured according to DIN 53457.
Stress at Maximum load (MPa) was measured according to DIN 53457.
Stress at Break (MPa) was measured according to DIN 53457.
Elongation at Break (%) was measured according to DIN 53457.
Elastic Modulus (E-Modulus) (MPa) was measured according to DIN 53457.
Notched-Izod Impact (KJ/m$^2$) was measured according to ISO 180.
Notched Charpy Impact (KJ/m$^2$) was measured according to ISO 179.
Melt Flow Ratio "MFR @ 260° C." (g/10 min) was measured according to ASTM D 1238 (260° C., 2.16 Kg).
Melt Index (g/10 min) was measured according to ASTM 1238 D, condition E.
Density was measured according to ASTM 1238.

Polymers used

Exact™ 4049 is an ethylene-butene copolymer produced using metallocene catalyst which contains 26 wt % of butene and has a melt index (MI at 190° C., 2.16 kg) of 4.2 g/10 min and a density of 0.873 g/cm$^3$. It has an Mw/Mn ratio of 1.9.

Pocan™ 1505 is a polybutylene terephthalate polymer manufactured by Bayer having an MFR at 250° C., under a weight of 2.16 kg, of 12 g/10 min.

Prior to performing any experiments, all the pellets of the blends were dried at 120° C. for 5 hours in a dry air oven prior to injection molding. Testing samples were produced on a 30 ton injection molding machine with nozzle, front, rear and mold temperatures of 240° C., 250° C., 240° C., 230° C. and 75° C. respectively.

EXAMPLE 1

Exact 4049™ was modified on a twin screw extruder with following temperature profile, 170° C., 180° C., 210° C., 210° C. and 200° C. Modification was performed at a 7 kg/h polymer feed rate and a 250 rpm screw speed. 4 weight percent maleic anhydride and 0.2 weight percent of peroxide were added. The maleic anhydride modified polymer had a final grafting level of 3% and an MFR (230° C., 5 kg) of 3 g/10 min.

EXAMPLE 2

Under the same extrusion conditions as described in Example 1 but with a 1.5 weight percent maleic anhydride feed and a 0.05 weight percent Luperox™ 130, Exact™ 4049 was grafted to produce a maleic anhydride modified polymer having a maleic anhydride content of 1.2% and an MFR (230° C., 5 kg) of 10 g/10 min. This modified polymer is called POL 1 in Table 1.

EXAMPLE 3

The maleic anhydride grafted ethylene copolymer from example 1 was dry blended with Exact™ 4049 in a 40/60 ratio by weight ( referred to as blend 1 in Table 1) and the dry blend was fed to a 34 mm, 36 L/D co-rotating intermeshing twin screw extruder to be blended in a 20/80 ratio with Pocan™ 1505 under the following conditions: feed rate of 6 kg per hour with a 100 rpm screw speed and a temperature profile of approximately 240° C., 240° C., 240° C., 240° C., 210° C., 210° C., 210° C., 210° C., 210° C., 260° C. Strand cutting was used as a finishing operation.

EXAMPLE 4

The maleic anhydride grafted ethylene copolymer from example 1 was blended with Exact™ 4049 in a 40/60 ratio by weight (referred to as blend 2 in Table 2) on a 34 mm, 36 L/D co-rotating intermeshing twin screw extruder under the following conditions: feed rate of 15 kg per hour with a 150 rpm screw speed at 210° C. Hot phase cutting was used as a finishing operation.

TABLE 1

|  | A | B | C | D | E | F | G | H |
| --- | --- | --- | --- | --- | --- | --- | --- | --- |
| Blend 1 | 6 wt. % | 9 wt. % | 12 wt. % | 15 wt. % |  |  |  |  |
| POL1 |  |  |  |  | 6 wt. % | 9 wt. % | 12 wt. % | 15 wt. % |
| Pocan ™ 1505 | 94 wt. % | 91 wt. % | 88 wt. % | 85 wt. % | 94 wt. % | 91 wt. % | 88 wt. % | 85 wt. % |
| Flex. Mod. cond., (MPa) | 2169 | 2000 | 1861 | 1722 | 2137 | 1977 | 1823 | 1677 |
| Properties on samples cond. |  |  |  |  |  |  |  |  |
| Stress at Maxload, MPa | 49 | 45 | 42 | 39 | 48 | 45 | 41 | 38 |
| Stress at Break, MPa | 21 | 23 | 19 | 23 | 15 | 25 | 22 | 21 |
| Elongation at break, % | 33 | 35 | 36 | 29 | 37 | 29 | 37 | 37 |
| E-modulus, MPa | 2290 | 2094 | 1952 | 1787 | 2137 | 2103 | 1933 | 1786 |
| Notched Impact Strength |  |  |  |  |  |  |  |  |
| Izod 23° C. (cond.), KJ/m$^2$ | 9* | 15* | 51 | 66 | 10* | 14* | 20* | 62 |
| Izod 0° C., KJ/m$^2$ | 8* | 13* | 16* | 20* | 9* | 13* | 15* | 17* |
| Notched Impact Strength |  |  |  |  |  |  |  |  |
| Charpy 23° C. (cond.), KJ/m$^2$ | 8* | 12* | 17 | 31 | 8* | 11* | 13* | 30 |
| Charpy 0° C., KJ/m$^2$ | 6* | 9* | 11* | 14* | 7* | 10* | 11* | 12* |
| MFR(260° C./2.16 Kg), g/l min | 21 | 19 | 17 | 15 | 22 | 20 | 18 | 16 |

* = Samples broken

TABLE 2

| | | | | | | |
|---|---|---|---|---|---|---|
| Blend 1 | 9 wt. % | 12 wt. % | 15 wt. % | | | |
| Blend 2 | | | | 9 wt. % | 12 wt. % | 15 wt. % |
| Pocan ™ 1505 | 91 wt. % | 88 wt. % | 85 wt. % | 91 wt. % | 88 wt. % | 85 wt. % |
| Flex. Mod. cond., MPa | 2051 | 1873 | 1707 | 2103 | 1847 | 1718 |
| Properties on conditioned samples. | | | | | | |
| Stress at Maxload, MPa | 45 | 42 | 39 | 46 | 41 | 39 |
| Stress at Break, MPa | 19 | 20 | 20 | 20 | 19 | 19 |
| Elongation at break, % | 32 | 36 | 56 | 41 | 41 | 35 |
| E-modulus, MPa | 2092 | 1936 | 1798 | 2141 | 1942 | 1775 |
| Notched Impact Strength | | | | | | |
| Izod 23° C.(cond.), KJ/m$^2$ | 12* | 57 | 73 | 12* | 54 | 67 |
| Izod 0° C., KJ/m$^2$ | 12* | 14* | 17* | 10* | 15* | 17* |
| MFR(260° C./2.16 Kg), g/10 min | 17 | 14 | 11 | 19 | 15 | 12 |

The data in Table 1 indicate that when the Blend 1 is used, a jump in impact performance is observed at 12% modifier level whereas with POL 1, a 15% modifier level is required to obtain similar performances. Also with Blend 1, the impact improvement occurs without any loss in stiffness which is another advantage of the invention.

The data in Table 2 confirm that the improvement in modifier efficiency is independent of the method used to prepare the blend of the maleic anhydride functionalized ethylene copolymer and the unfunctionalized ethylene copolymer. As shown, similar performances are obtained when either a dry blend or an extruder blend is used.

What is claimed is:

1. A composition comprising:
   a) 2 to 50 weight % of an first ethylene alpha-olefin copolymer having a density of 0.86 to 0.91 g/cc, a Melt Index of 150 g/10 min or less and an Mw/Mn of 4 or less modified with an unsaturated acid or anhydride and a second ethylene alpha-olefin copolymer having a density of 0.86 to 0.925 g/cm$^3$ and/or homopolyethylene having a density of 0.910 to 0.935 g/cm$^3$; and
   b) 98 to 50 weight percent of a thermoplastic polymer comprising a functional group capable of interacting with the unsaturated acid or anhydride, provided that the thermoplastic polymer is not a polyamide.

2. The composition of claim 1 wherein the unsaturated acid or anhydride is maleic anhydride or maleic acid.

3. The composition of claim 1 wherein the second ethylene copolymer has a density of 0.86 to 0.925 g/cm$^3$ and a CDBI of over 80%.

4. The composition of claim 1 wherein the thermoplastic polymer is a polybutylene terephthalate or polycarbonate.

5. The composition of claim 1 wherein the first ethylene copolymer has a vinylidene to vinyl end chain unsaturation ratio of 3 or less.

6. The composition of claim 1, 2, 3, 4, or 5 wherein the first ethylene copolymer has a density of 0.86 to 0.88 g/cc, a Melt Index of 50 g/10 min or less and an Mw/Mn between 1 and 3.

7. The composition of claim 1, 2, 3, 4 or 5 wherein the first ethylene copolymer has a density of 0.86 to 0.88 g/cc, a Melt Index of 10 g/10 min or less and an Mw/Mn between 1 and 2.

8. The composition of claim 1, 2, 3, 4 or 5 wherein the first ethylene copolymer is the same as the second ethylene copolymer except that the first ethylene copolymer has been modified with an unsaturated acid or anhydride.

9. The composition of claim 1, 2, 3, 4 or 5 wherein the first ethylene copolymer, prior to modification with the unsaturated acid or anhydride, and/or the second ethylene copolymer has an Elastic Modulus of 150 or less at a normalized frequency of 200 rad•Pa.

10. The composition of claim 1, 2, 3, 4, or 5 wherein the first ethylene copolymer has a density of 0.86 to 0.88 g/cc, a Melt Index of 50 g/10 min or less, an Mw/Mn between 1 and 3 and wherein the first ethylene copolymer, prior to modification with the unsaturated acid or anhydride, and/or the second ethylene copolymer has an Elastic Modulus of 150 or less at a normalized frequency of 200 rad•Pa.

11. The composition of claim 1, 2, 3, 4 or 5 wherein the first ethylene copolymer has a density of 0.86 to 0.88 g/cc, a Melt Index of 10 g/10 min or less, an Mw/Mn between 1 and 2 and wherein the first ethylene copolymer, prior to modification with the unsaturated acid or anhydride, and/or the second ethylene copolymer has an Elastic Modulus of 150 or less at a normalized frequency of 200 rad•Pa.

12. A method of modifying a thermoplastic polymer comprising combining:
   a) 2 to 50 weight % of an first ethylene alpha-olefin copolymer having a density of 0.86 to 0.91 g/cc, a Melt Index of 150 g/10 min or less and an Mw/Mn of 4 or less modified with an unsaturated acid or anhydride and a second ethylene alpha-olefin copolymer having a density of 0.86 to 0.925 g/cm$^3$ and/or a homopolyethylene having a density of 0.910 to 0.935 g/cc; with
   b) 98 to 50 weight percent of the thermoplastic polymer provided that the thermoplastic polymer comprises a functional group capable of interacting with the unsaturated acid or anhydride, provided that the thermoplastic polymer is not a polyamide.

13. The method of claim 12 wherein the thermoplastic polymer is polybutylene terephthalate or polycarbonate and the unsaturated acid or anhydride is maleic anhydride or maleic acid.

14. The method of claim 12 wherein the unsaturated acid or anhydride is maleic anhydride or maleic acid.

15. The method of claim 12 wherein the second ethylene copolymer has a density of 0.86 to 0.925 g/cm$^3$ and a CDBI of over 80% and wherein the first ethylene copolymer has density of 0.86 to 0.88 g/cc, a Melt Index of 50 g/10 min or less and an Mw/Mn between 1 and 3.

16. The method of claim 12 wherein the first ethylene copolymer has a density of 0.86 to 0.88 g/cc, a Melt Index of 10 g/10 min or less and an Mw/Mn between 1 and 2.

17. The method of claim 12 wherein the first ethylene copolymer is the same as the second ethylene copolymer except that the first ethylene copolymer has been modified with an unsaturated acid or anhydride.

18. The method of claim 12 wherein the first ethylene copolymer, prior to modification with the unsaturated acid or anhydride, and/or the second ethylene copolymer has an Elastic Modulus of 150 or less at a normalized frequency of 200 rad•Pa.

19. The method of claim 14 wherein the first ethylene copolymer has a density of 0.86 to 0.88 g/cc, a Melt Index of 50 g/10 min or less, an Mw/Mn between 1 and 3 and wherein the first ethylene copolymer, prior to modification with the unsaturated acid or anhydride, and/or the second ethylene copolymer has an Elastic Modulus of 150 or less at a normalized frequency of 200 rad•Pa.

20. The composition of claim 1, 2, 3, 4 or 5 wherein the first ethylene copolymer has a density of 0.86 to 0.88 g/cc, a Melt Index of 10 g/10 min or less, an Mw/Mn between 1 and 2 and wherein the first ethylene copolymer, prior to modification with the unsaturated acid or anhydride, and/or the second ethylene copolymer has an Elastic Modulus of 150 or less at a normalized frequency of 200 rad•Pa.

* * * * *